(12) United States Patent
Izumita et al.

(10) Patent No.: US 7,245,236 B2
(45) Date of Patent: Jul. 17, 2007

(54) DATA PROCESSING METHOD AND CIRCUIT FOR DATA RECORDING AND REPRODUCING AND DATA RECORDING AND REPRODUCING APPARATUS

(75) Inventors: Morishi Izumita, Tokyo (JP); Terumi Takashi, Kanagawa-ken (JP); Yasuyuki Itou, Kanagawa (JP); Masaharu Kondou, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/280,435

(22) Filed: Nov. 15, 2005

(65) Prior Publication Data

US 2006/0114137 A1 Jun. 1, 2006

(30) Foreign Application Priority Data

Nov. 26, 2004 (JP) ............... 2004-341625

(51) Int. Cl.
*H03M 7/00* (2006.01)
(52) U.S. Cl. .......................... 341/59; 341/50
(58) Field of Classification Search ............ 341/50–90
See application file for complete search history.

(56) References Cited

U.S. PATENT DOCUMENTS 6,631,490 B2 * 10/2003 Shimoda ..................... 714/755
6,694,477 B1 * 2/2004 Lee ............................. 714/784
6,757,122 B1 * 6/2004 Kuznetsov et al. ......... 714/794
6,933,865 B1 * 8/2005 Kuznetsov et al. ........... 341/59

FOREIGN PATENT DOCUMENTS

JP 11-007736 1/1999

* cited by examiner

*Primary Examiner*—Lam T. Mai
(74) *Attorney, Agent, or Firm*—Townsend and Townsend and Crew LLP; Patrick Duncan

(57) ABSTRACT

Embodiments of the invention a signal processing method capable of realizing low decoding error ratio by using a simple configuration free from unnecessary redundant bits. In one embodiment, user data (512 bytes+additional data) input to an input terminal is RLL-encoded by a RLL encoder_1. The data from the RLL encoder_1 is entered into a symbol error correction encoder where 9-bit symbol encoding is done. Its RS code portion is RLL-encoded by a RLL encoder_2. Signal read from a magnetic disk is entered into a RLL decoder_2 where the RS code portion is RLL-decoded. The signal from the RLL decoder_2 is then entered into a symbol error correction decoder where random read/write errors, burst errors attributable to defects and other errors are corrected to produce a (user data+RLL) signal. This data is output to an output terminal after being decoded by a RLL decoder_1.

12 Claims, 4 Drawing Sheets

$$H = \begin{vmatrix} 1 & 1 & 1 & 1 & 1 & 0 \\ \alpha^{(q-2)} & \alpha^{(q-2)} & \alpha & 1 & 0 & 0 \\ & & & & & \\ \alpha^{(h-2)(q-2)} & \alpha^{(h-2)(q-2)} & \alpha^{(h-2)} & 1 & 0 & 0 \\ \alpha^{(h-1)(q-2)} & \alpha^{(h-1)(q-2)} & \alpha^{(h-1)} & 1 & 0 & 1 \end{vmatrix}$$

DATA PROCESSING METHOD AND CIRCUIT FOR DATA RECORDING AND REPRODUCING AND DATA RECORDING AND REPRODUCING APPARATUS

CROSS-REFERENCES TO RELATED APPLICATIONS

This application claims priority from Japanese Patent Application No. JP2004-341625, filed Nov. 26, 2004, the entire disclosure of which is incorporated herein by reference.

BACKGROUND OF THE INVENTION

The present invention relates to a data processing method for data recording and reproducing by which data to be recorded on a recording medium is encoded and data read therefrom is decoded. More particularly, the invention relates to a high efficiency error correction encoding method for encoding data to be recorded and an error correction decoding method for decoding read signal to reproduce highly error-free data.

Magnetic disk devices (hereinafter referred to as HDDs) and other data recording and reproducing apparatus have been facing a further intensifying demand for higher recording densities. In the field of signal processing technology which supports these recording and reproducing apparatus, progress has also been made to allow higher recording densities.

FIG. 2 shows an example of a data recording and reproducing circuit in a HDD. On the recording side of FIG. 2, error correction encoding of data input to an input terminal 1 is performed by a symbol error correction encoder 20. Typically, a Reed-Solomon code (hereinafter referred to as a RS code) is used as the error correction code. In addition, RLL (Run Length Limited) encoding is performed by a RLL encoder 10 to suppress repetition of either "1" or "0" in magnetic recording and reproducing of data. Then, a recording processing circuit 30 adds synchronization signal and others before information is recorded on a recording medium 60 via a write amplifier 40 and a write head 50.

On the reproducing side, a signal read by a read head 150 is amplified by a read amplifier 140 and put to a reproducing processing circuit 130 where synchronization signal detection and others are performed. Then, RLL decoding is performed in a RLL decoder 110 and code error correction is performed by a symbol error correction decoder 120 which corrects errors including random read/write errors and burst errors attributable to a defect. The result is output to an output terminal 2.

Generally, in data processing for recording and reproducing in a HDD, error correction encoding of the input data is performed by a symbol error correction encoder. The error correction code is a Reed-Solomon code (hereinafter referred to as a RS code), a class of algebraic geometric codes. 512 bytes of input data with several bytes (some 10 bytes) of additional data are encoded and decoded by adding error correction redundant symbols.

In typical RS codes, one symbol is composed of 8 bits. To make t-byte errors correctable, a 2t-byte RS code is added to 512 bytes of input data with several additional data bytes. If an 8-bit error correction code is used, the total number of data to be corrected must be not larger than $2^8-1=255$ in bytes (2040 in bits). In this case, 3 or 4 interleaves are therefore performed for encoding.

Further, these encoded data are RLL-encoded to suppress repetition of either "1" or "0" before being recorded on the recording medium. For reproducing, decoding of this RLL code is done before RS code-based decoding is done.

Patent Document 1 (Japanese Patent Laid-Open No. Hei 11-7736) proposes a method in which input data is RLL-encoded before RS-encoding is performed (hereinafter referred to as RLL-ECC) and a method in which encoding into a 9-bit RS code is implemented through two interleaves. This RLL-ECC method has an advantage that read/write errors do not propagate in the process of RLL decoding.

BRIEF SUMMARY OF THE INVENTION

A problem with the invention described in the aforementioned Patent Document 1 is that since encoding is implemented through two interleaves, the performance of the code is not fully brought out. According to Shannon's channel coding theorem, this is because to improve the performance, it is important to minimize the number of interleaves and maximize the code length.

For this reason, it is recently proposed to employ one-interleave (non interleave) encoding by using a 10-bit symbol RS code. In this case, a 1-interleave error correction code can be constructed for a maximum of $2^{10}-1$ (=1023) symbols of input data. However, the 10-bit symbol RS code has a disadvantage of larger redundancy.

It is a feature of the present invention to provide a data recording and reproducing method and circuit which realize a low redundancy and high error correctability code construction.

It is also a feature of the present invention to provide a high data error correctability data recording and reproducing apparatus.

A data recording and reproducing processing method according to an aspect of the present invention is characterized in that input data is encoded and recorded on a recording medium in units of J (J: positive integer) blocks each containing 512 bytes of input data with additional data and original data is reproduced from a read signal, comprising the steps of: RLL (Run length Limited)-encoding of the input data; algebraic-geometric encoding by which the RLL-encoded data is interleaved with J algebraic-geometric code symbols each composed of 9 bits.

The algebraic-geometric encoding is such that Reed Solomon (RS) error detection/correction code symbols each composed of 9 bits are added to the RLL-encoded data.

Alternatively, the algebraic-geometric encoding is such that expanded (extended) Reed Solomon (RS) error detection/correction code symbols each composed of 9 bits are added to the RLL-encoded data.

A data recording and reproducing processing method according to another aspect of the present invention comprises the steps of: RLL (Run Length Limited) encoding of data; algebraic-geometric encoding of the RLL-encoded data with 9-bit symbols; RLL-encoding of the algebraic-geometric code portion; recording the data on a recording medium; RLL-decoding the algebraic-geometric code portion of read data; error-correcting the read data by using the algebraic-geometric code; and RLL-decoding the error-corrected read data to reproduce the data.

The algebraic-geometric encoding is such that Reed Solomon (RS) error detection/correction code symbols each composed of 9 bits are added to the RLL-encoded data.

Alternatively, the algebraic-geometric encoding is such that expanded (extended) Reed Solomon (RS) error detection/correction code symbols each composed of 9 bits are added to the RLL-encoded data.

A data recording and reproducing processing circuit according to another aspect of the present invention comprises: a first RLL (Run Length Limited) encoder by which input data is RLL-encoded; a symbol error correction encoder by which algebraic-geometric encoding of the RLL-encoded data from the first RLL encoder is performed with 9-bit symbols; a second RLL encoder by which the algebraic-geometric code portion of the data from the symbol error correction encoder is RLL-encoded; a second RLL decoder by which the algebraic-geometric code portion of data read from a recording medium is RLL-decoded; a symbol error correction decoder by which error correction of the read data is performed by using the algebraic-geometric code; and a first RLL decoder by which the error-corrected read data is RLL-decoded.

The algebraic-geometric encoding is such that Reed Solomon (RS) error detection/correction code symbols each composed of 9 bits are added to the RLL-encoded data.

Alternatively, the algebraic-geometric encoding is such that expanded (extended) Reed Solomon (RS) error detection/correction code symbols each composed of 9 bits are added to the RLL-encoded data.

A data recording and reproducing apparatus according to another aspect of the present invention comprises: a first RLL (Run Length Limited) encoder by which input data is RLL-encoded; a symbol error correction encoder by which algebraic-geometric encoding of the RLL-encoded data from the first RLL encoder is performed with 9-bit symbols; a second RLL encoder by which the algebraic-geometric code portion of the data from the symbol error correction encoder is RLL-encoded; a write head by which write data, output from the second RLL encoder, is recorded on a recording medium; a read head by which data recorded on the recording medium is read; a second RLL decoder by which the algebraic-geometric code portion of data read by the read head is RLL-decoded; a symbol error correction decoder by which error correction of the read data is performed by using the algebraic-geometric code; and a first RLL decoder by which the error-corrected read data is RLL-decoded.

The algebraic-geometric encoding is such that Reed Solomon (RS) error detection/correction code symbols each composed of 9 bits are added to the RLL-encoded data.

The algebraic-geometric encoding is such that expanded (extended) Reed Solomon (RS) error detection/correction code symbols each composed of 9 bits are added to the RLL-encoded data.

According to the present invention, it is possible to provide a data recording and reproducing processing method and circuit which realize low decoding error ratio without unnecessary redundant bits.

DETAILED DESCRIPTION OF THE INVENTION

Figure 1:
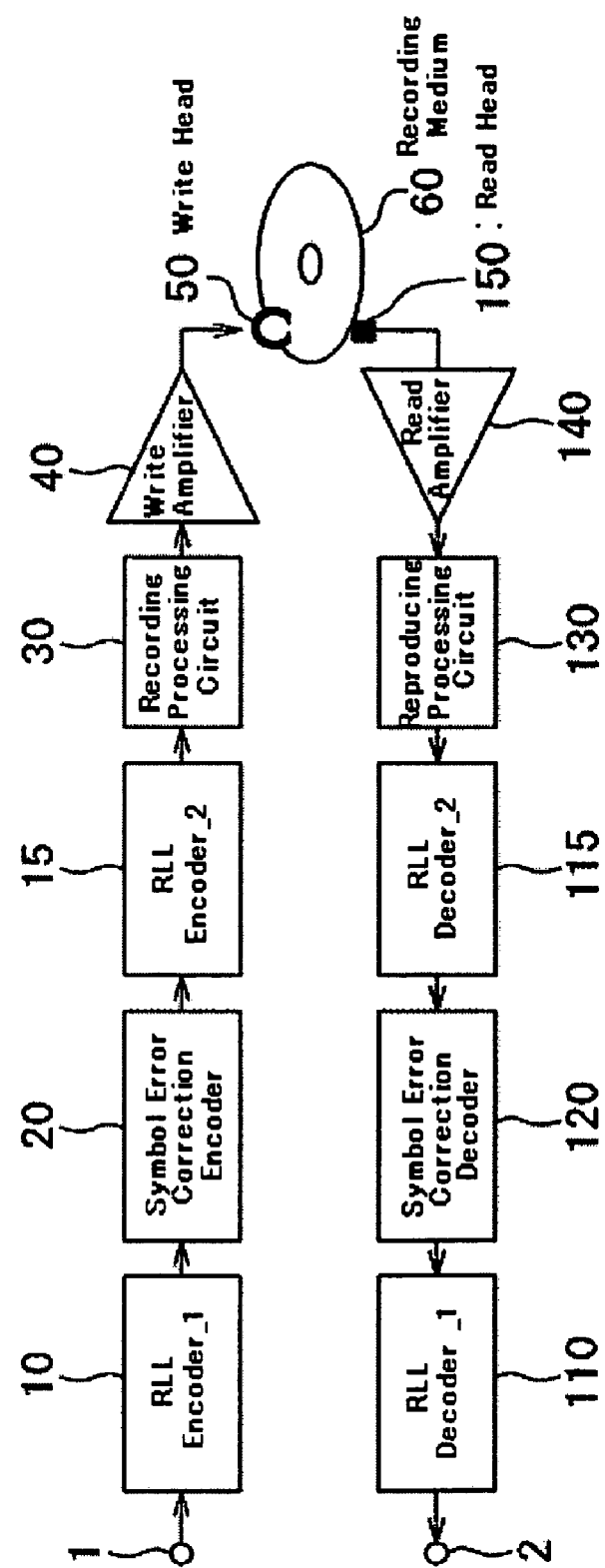
FIG. 1 is a block diagram of a magnetic disk apparatus, a first embodiment of the present invention.
Figure 2:
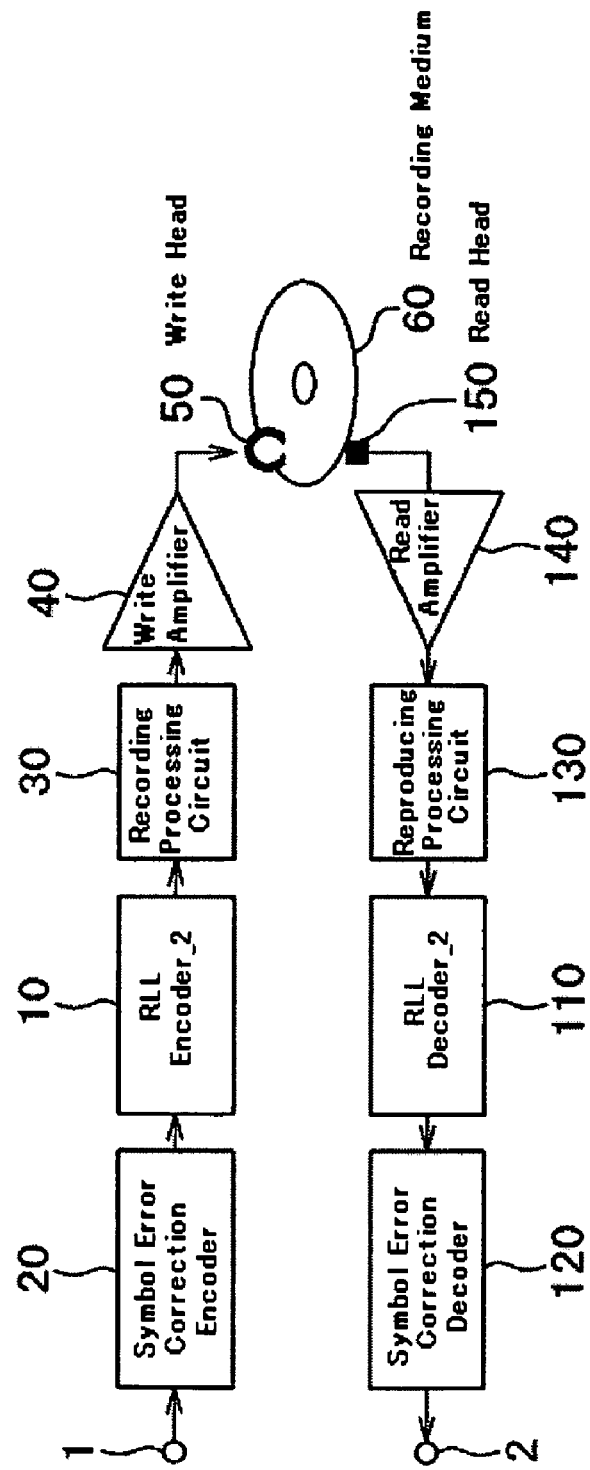
FIG. 2 is a block diagram of a prior art magnetic disk apparatus.
Figure 3:
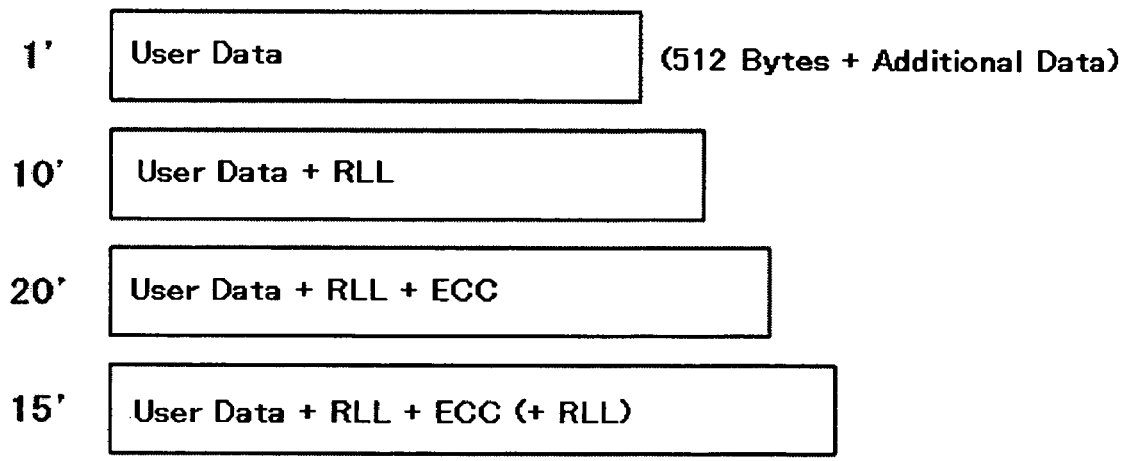
FIG. 3 shows how data is encoded in the first embodiment of the present invention.
Figure 4:
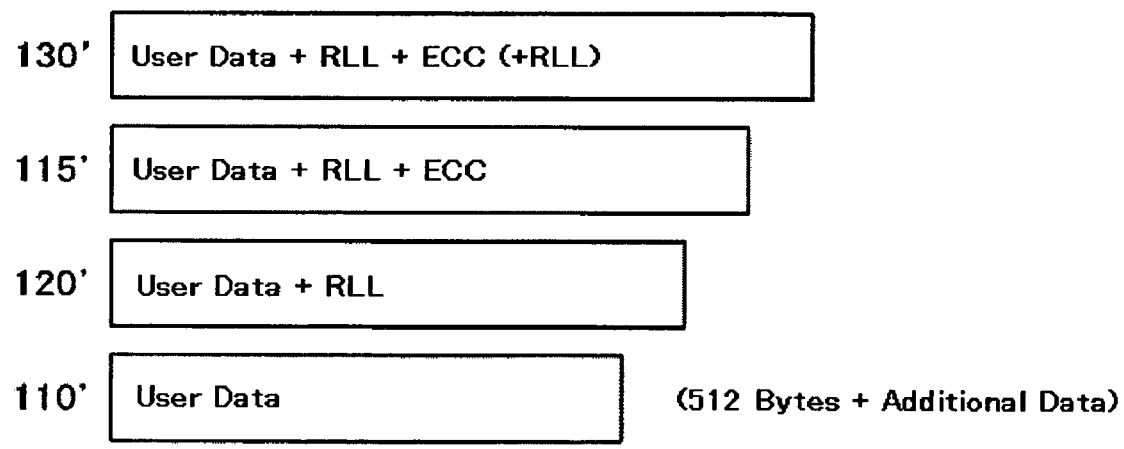
FIG. 4 shows how data is decoded in the first embodiment of the present invention.

With reference to the drawings, the following will describe a data recording and reproducing apparatus according to an embodiment of the present invention. FIG. 1 shows the configuration of a magnetic disk apparatus as an example of the data recording and reproducing apparatus. FIG. 3 shows the flow of data encoding whereas FIG. 4 shows the flow of data decoding. Note that in this embodiment, J=1 holds, that is 512 bytes of data with several bytes of additional data (CRC, etc.) are encoded through one interleave.

On the recording side, user data (512 bytes+additional data), as shown in 1' of FIG. 3, input to an input terminal 1 is RLL-encoded by a RLL encoder 1_(10) as shown in 10' of FIG. 3. Preferably, this RLL code has a high code rate. This is because the total data including the input data, RLL code and 9-bit RS code cannot exceed $2^9-1$ (511) symbols or 4599 bits which is the limit of the code length. Note that it is possible to expand the code length by up to 2 symbols by using an expanded (extended) RS code as described later.

The data from a RLL encoder_1 is entered into a symbol error correction encoder 20 where 9-bit symbol RS encoding is done (20' in FIG. 3). Note that since its RS code portion has not been RLL-encoded, only this portion is RLL-encoded by a RLL encoder_2 (15) (15' in FIG. 3). This portion may be encoded by a large redundancy code since the portion is not subject to RS encoding. In addition, it is also possible to add a parity code and the like in order to cope with short read/write errors (not shown in the figure). Then, a synchronization signal and the like are added in a recording processing circuit 30 before information recording is done on a recording medium (magnetic disk) 60 via a write amplifier 40 and a write head 50.

On the reproducing side, signal read by a read head 150 from the magnetic disk 60 is amplified by a read amplifier 140 and entered into a reproducing processing circuit 130 where synchronization signal detection and others are done (130' in FIG. 4). If the read signal includes a parity code added before recording, this parity code is removed after short errors are corrected (not shown in the figure).

Then, the RS code is RLL-decoded by a RLL decoder_2 (115) as shown in 115' of FIG. 4. Further, random read/write errors, burst errors attributable to defects and other errors are corrected by a symbol error correction decoder 120 to produce a (user data+RLL) signal (120' in FIG. 4). This data is output to an output terminal 2 after decoded by a RLL decoder_1 (110) (110' in FIG. 4).

Thus, construction can be completed through one interleave whereas an 8-bit error correction code requires three or four interleaves. Consequently, this code construction can provide improved correcting capability while the redundancy of the error correction code is smaller than in encoding in ten bits.

Figures 5, 6:
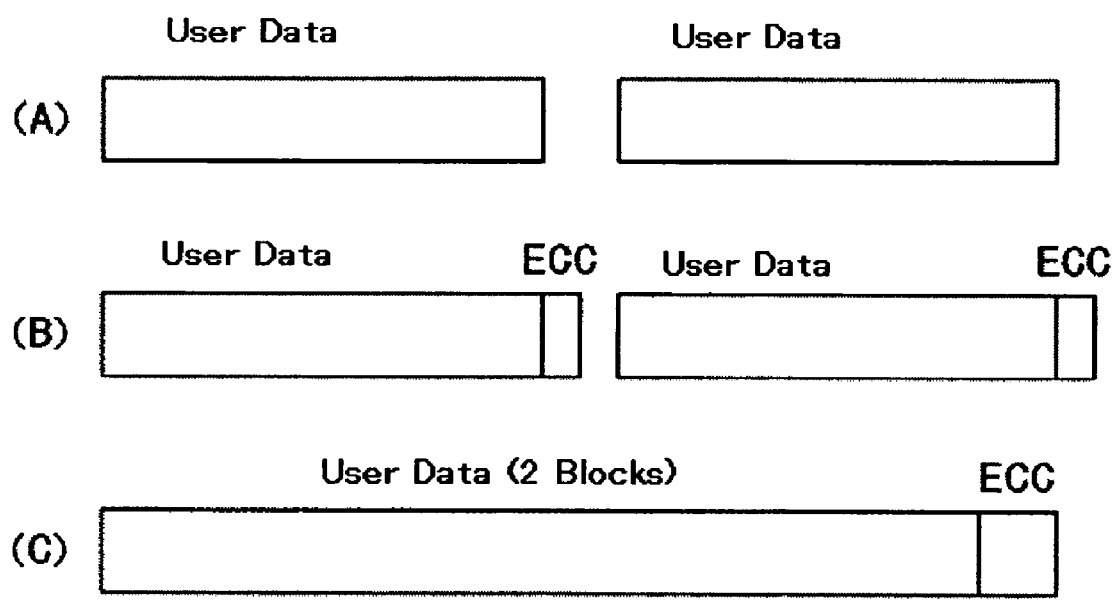
FIG. 5 shows a check matrix of an expanded (extended) Reed-Solomon code.
FIG. 6 shows how data is encoded in a second embodiment of the present invention.

Further, it is possible to expand the code length by using an expanded (extended) RS code. This expanded (extended) RS code is structured as described in "Hideki Imai, "Coding Theory", The Institute of Electronics, Information and Communication Engineers, p 155–158". FIG. 5 shows a check matrix where α is the primitive (q−1)th root of 1. Given a RS code whose roots are 1, α, $α^2$, $α^3$, . . . , $α^{(h-1)}$, a q-element code expressed in an h×(q+1) matrix obtained by adding two rows to the RS code matrix is its expanded (extended) RS code. This code has a code length of (q+1). A q-element code of code length q whose check matrix is an h×q matrix obtained by removing the rightmost column from the h×(q+1) matrix is also called an expanded (extended) RS code. This code is a maximum distance separable code when the minimum distance is h+1.

By using such an expanded (extended) RS code, it is possible to expand the code length of the 9-bit symbol RS code as mentioned above. Up to 513 symbols (4617 bits), 2 symbols longer than the $2^9-1$ (511) symbols of user data, can be encoded.

It is assumed below that 20 symbols are to be corrected through RS encoding of 512 bytes (4096 bits) of user data with 10 bytes (80 bits) of additional data. If the error correction code uses 8 bits per symbol, 20×2×8=320 bits are required. Likewise, 20×2×9=360 bits and 20×2×10=400 bits are respectively required if the error correction code uses 9 bits and 10 bits per symbol. Thus, the total number of bits increases as follows:

1 symbol=8 bits: 4176+320=4496 bits 1 symbol=9 bits: 4176+360=4536 bits 1 symbol=10 bits: 4176+400=4576 bits Table 1 shows how the bit population (8, 9 or 10 bits) of the base RS code field is related with the maximum number of symbols and the maximum number of bits.

TABLE 1

|  | Symbol | Total Bit |
|---|---|---|
| 8 bit | $2^8-1$ 255 | 2040 |
| 9 bit | $2^9-1$ 511 | 4599 |
| 10 bit | $2^{10}-1$ 1023 | 10230 |

Conventionally, 3- or 4-interleave construction is employed when an 8-bit RS code is used. This is because efforts have been made to improve performance by using a 10-bit RS code for 1-interleave construction.

Table 2 shows how data is constructed when the RLL-ECC method is employed. Although 100 bits of data are RLL-encoded to 101 bits by the RLL encoder_1 in this example, RLL encoding is not limited to this specific example. 4096 bits of user data with 80 bits of additional data (CRC, etc.) result in 4218 bits of data in total after the RLL encoder_1.

TABLE 2

|  | Data (Byte) (Bit) | CRC + etc (Byte) (Bit) | Sum (Bit) | Sum RLL_1 (Bit) | Sum + RLL_1 (Bit) |
|---|---|---|---|---|---|
| 9 bit | 512 4096 | 10 80 | 4176 | 42 | 4218 |
| 10 bit | 512 4096 | 10 80 | 4176 | 42 | 4218 |
|  |  |  | (100/101) |  |  |

Table 3 shows how data is constructed as a result of adding 20-symbol RS code ECC data and RLL-encoding of this ECC data by the RLL-encoder_2. This encoding can be implemented unless the number of the resulting total data bits exceeds 4599 bits which is the largest code length which may be constructed by a 9-bit code.

TABLE 3

|  | Sum + RLL_1 (Bit) | ECC (Symbol) (Bit) | Sum-2 (Bit) | ECC + RLL_2 (Bit) | Total Data (Bit) | Diff. ECC (%) | Diff. Data Total (%) |
|---|---|---|---|---|---|---|---|
| 9 bit | 4218 | 20 360 | 4578 | 372 | 4590 | 10.14 | 0.91 |
| 10 bit | 4218 | 40 400 | 4618 | 414 | 4632 | 0.00 | 0.00 |
|  |  | <4599 | (30/31) |  |  |  |  |

The RLL encoder_2 has nothing to do with the 9-bit ECC construction. Thus, for example, 30 bits of data may be RLL-encoded to 31 bits although the RLL encoding is not limited to this specific example. Consequently, the 9-bit code construction enables a data reduction of about 10% in the ECC data portion and about 0.9% in total as compared with the 10-bit code construction. This reduction can also be utilized to raise the correcting performance, namely, increase the number of errors to be corrected by the ECC.

In addition, the code length allowed by a 9-bit symbol RS code can be increased by 2 symbols to 513 symbols if its expanded (extended) RS code is used. This makes it possible to add a longer ECC as well.

Now the following describes a second embodiment of the present invention with reference to FIG. 6. J (J: positive integer) blocks each containing 512 bytes of input data and several bytes of additional data are encoded. When J=1, a 1-interleave structure is produced from the 512 bytes of input data and several bytes of additional bytes. This is the most efficient code construction. When J is equal to 2 or larger, a 9-bit algebraic-geometry code is interleaved with J data blocks to construct data. This allows high efficiency code construction.

J (J: positive integer) blocks each containing 512 bytes of input data and several bytes of additional data are RLL-encoded. Then, an algebraic-geometry error detection/correction code which uses 9 bits per symbol is added through J interleaves to construct a read/write code. The following describes this flow on the assumption that J is 2.

FIG. 6(A) shows the construction of input data while FIG. 6(B) shows an example of a 1-interleave construction described along with the first embodiment of the present invention. 512 bytes of input data and several bytes of additional data (denoted as user data in the figure) are RLL-encoded by the RLL encoder_1 (not shown in the figure) and a RS code is added to the result. Further, the RS code is RLL-encoded by the RLL encoder_2 (not shown in the figure). FIG. 6(C) is a J(=2)-interleave code construction. Two blocks each containing 512 bytes of input data and several bytes of additional data are RLL-encoded by the RLL encoder_1 (not shown in the figure). These data are interleaved with 9-bit RS code symbols. Further, the RS code is RLL-encoded by the RLL encoder_2 (not shown in the figure).

As mentioned so far, this code construction enables higher correcting ability since it not only provides higher performance than interleaving with 8-bit symbols but also reduces the redundancy of the error correction code as compared with encoding in ten bits.

Needless to add, the present invention is applicable to both longitudinal and perpendicular magnetic recording apparatus. It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A data recording and reproducing processing method in which input data is encoded and recorded on a recording medium in units of J (J: positive integer) blocks each containing 512 bytes of input data with additional data and original data is reproduced from a read signal, comprising:
RLL (Run length Limited)-encoding of the input data;
algebraic-geometric encoding by which the RLL-encoded data is interleaved with J algebraic-geometric code symbols each composed of 9 bits; and
RLL-encoding of the J algebraic-geometric code symbols.

2. A data recording and reproducing processing method according to claim 1, wherein the algebraic-geometric encoding is such that Reed Solomon (RS) error detection/correction code symbols each composed of 9 bits are added to the RLL-encoded data.

3. A data recording and reproducing processing method according to claim 1, wherein the algebraic-geometric encoding is such that expanded (extended) Reed Solomon (RS) error detection/correction code symbols each composed of 9 bits are added to the RLL-encoded data.

4. A data recording and reproducing processing method comprising:
RLL (Run Length Limited) encoding of data;
algebraic-geometric encoding of the RLL-encoded data with 9-bit symbols to produce an algebraic-geometric code portion;
RLL-encoding of the algebraic-geometric code portion;
recording the data on a recording medium;
RLL-decoding the algebraic-geometric code portion of read data;
error-correcting the read data by using the algebraic-geometric code; and
RLL-decoding the error-corrected read data to reproduce the data.

5. A data recording and reproducing processing method according to claim 4, wherein the algebraic-geometric encoding is such that Reed Solomon (RS) error detection/correction code symbols each composed of 9 bits are added to the RLL-encoded data.

6. A data recording and reproducing processing method according to claim 4, wherein the algebraic-geometric encoding is such that expanded (extended) Reed Solomon (RS) error detection/correction code symbols each composed of 9 bits are added to the RLL-encoded data.

7. A data recording and reproducing processing circuit comprising:
a first RLL (Run Length Limited) encoder by which input data is RLL-encoded;
a symbol error correction encoder by which algebraic-geometric encoding of the RLL-encoded data from the first RLL encoder is performed with 9-bit symbols to produce an algebraic-geometric code portion;
a second RLL encoder by which the algebraic-geometric code portion of the data from the symbol error correction encoder is RLL-encoded;
a second RLL decoder by which the algebraic-geometric code portion of data read from a recording medium is RLL-decoded;
a symbol error correction decoder by which error correction of the read data is performed by using the algebraic-geometric code; and
a first RLL decoder by which the error-corrected read data is RLL-decoded.

8. A data recording and reproducing processing circuit according to claim 7, wherein the algebraic-geometric encoding is such that Reed Solomon (RS) error detection/correction code symbols each composed of 9 bits are added to the RLL-encoded data.

9. A data recording and reproducing processing circuit according to claim 7, wherein the algebraic-geometric encoding is such that expanded (extended) Reed Solomon (RS) error detection/correction code symbols each composed of 9 bits are added to the RLL-encoded data.

10. A data recording and reproducing apparatus comprising:
a first RLL (Run Length Limited) encoder by which input data is RLL-encoded;
a symbol error correction encoder by which algebraic-geometric encoding of the RLL-encoded data from the first RLL encoder is performed with 9-bit symbols to produce an algebraic-geometric code portion;
a second RLL encoder by which the algebraic-geometric code portion of the data from the symbol error correction encoder is RLL-encoded;
a write head by which write data, output from the second RLL encoder, is recorded on a recording medium;
a read head by which data recorded on the recording medium is read;
a second RLL decoder by which the algebraic-geometric code portion of data read by said read head is RLL-decoded;
a symbol error correction decoder by which error correction of the read data is performed by using the algebraic-geometric code; and
a first RLL decoder by which the error-corrected read data is RLL-decoded.

11. A data recording and reproducing apparatus according to claim 10, wherein the algebraic-geometric encoding is such that Reed Solomon (RS) error detection/correction code symbols each composed of 9 bits are added to the RLL-encoded data.

12. A data recording and reproducing apparatus according to claim 10, wherein the algebraic-geometric encoding is such that expanded (extended) Reed Solomon (RS) error detection/correction code symbols each composed of 9 bits are added to the RLL-encoded data.

* * * * *